United States Patent [19]
Polcyn

[11] Patent Number: 5,930,792
[45] Date of Patent: Jul. 27, 1999

[54] MONITORING AND DIRECTING FLOW OF HTML DOCUMENTS FOR SECURITY AND ACCESS

[75] Inventor: Michael J. Polcyn, Allen, Tex.

[73] Assignee: InterVoice Limited Partnership, Reno, Nev.

[21] Appl. No.: 08/747,013

[22] Filed: Nov. 7, 1996

[51] Int. Cl.[6] .................................................. G06F 17/30
[52] U.S. Cl. ........................ 707/9; 707/513; 707/514; 707/102; 707/10
[58] Field of Search .................................. 707/500, 513, 707/514, 516, 907, 9, 10, 100, 102, 1

[56] References Cited

U.S. PATENT DOCUMENTS

| | | | |
|---|---|---|---|
| 4,956,769 | 9/1990 | Smith | 707/9 |
| 5,144,557 | 9/1992 | Wang et al. | 707/9 |
| 5,239,648 | 8/1993 | Nukui | 707/10 |
| 5,539,906 | 7/1996 | Abraham et al. | 707/9 |
| 5,568,640 | 10/1996 | Nishiyama et al. | 707/1 |
| 5,678,041 | 10/1997 | Baker et al. | 707/9 |
| 5,696,966 | 12/1997 | Verlarde | 707/10 |
| 5,706,502 | 1/1998 | Foley et al. | 707/10 |
| 5,710,918 | 1/1998 | Lagarde et al. | 707/10 |
| 5,717,916 | 2/1998 | Verma | 707/7 |
| 5,801,702 | 9/1998 | Dolan et al. | 345/357 |

Primary Examiner—Paul V. Kulik
Assistant Examiner—Greta L. Robinson
Attorney, Agent, or Firm—Fulbright & Jaworski L.L.P.

[57] ABSTRACT

A computer server that stores a HTML document, receives a request via a global network from a user for the document and sends the document to the user. The computer server uses a state machine to examine the request to determine a current state status of the request and compares it to the required state status for accessing the document stored in a state transition model. If the current status fulfills the required status, then access to the document is granted. If the required status is not fulfilled, then the server sends an error message to the user denying access to the document. Thus, the server imposes a structured, hierarchical format onto a freeform hypertext links of HTML documents by restricting movement between the links to legal transitions.

43 Claims, 3 Drawing Sheets

5,930,792

MONITORING AND DIRECTING FLOW OF HTML DOCUMENTS FOR SECURITY AND ACCESS

TECHNICAL FIELD OF THE INVENTION

This invention relates to document transaction control and more particularly to an arrangement of a system and method for hierarchical structure for HTML documents on the world wide web on the internet.

BACKGROUND OF THE INVENTION

The popularity of personal computers has exploded in the past decade. Each year more and more people have used more and more personal computers in more and more ways. This rapid expansion in computer use has embraced the formation of on-line information sites on the World Wide Web. These Web sites not only have pictures and text, but may also include audio or video information available to the user or "surfer." World Wide Web sites are built for many different objectives, including advertising products and services to consumers, selling products and services directly to consumers, and distributing personal, corporate, and government information.

Each site on the World Wide Web is a construction of many different "pages" or documents, each written in HTML (hypertext markup language). The HTML page contains the text and formatting information for the page. An HTML document will typically have references, known as "links," to the locations of graphic images and other documents rather than include the images and other documents directly in the HTML document itself. Every document in the system or in the network, has its own unique address. When "visiting" a Web page or site, the user's Web browser requests and fetches the HTML document from the Web. The browser recognizes links to images and other documents and then retrieves them. The browser then fills the screen with the images and text according to the formatting information. Thus, documents can be linked to each other by specifying, in HTML, the addresses of the desired documents. This ability to link documents, thus enabling movement from any one document to another, is one of the great benefits of the World Wide Web. However, this ability can also be counteractive if attempting to provide a menu system that renders a very concise and structured set of transactions to a user.

A menu system is a set of transactions which are presented in a very hierarchical format. However, it is relatively easy to defeat the format, since the Web provides 'random' access to any of those documents at any point in the format, just by maintaining that link, i.e. by saving that link in the Web browser the user could jump back to the middle of the format. Specifically, a user is not forced to enter an HTML document or series of documents in any particular form. Banking transactions represent an exemplary case for exhibiting the extent of problems that can occur when using Web sites. Ideally, a customer (or user) would enter through a set of security screens, and enter an account number and a security number like a PIN. If the security transactions were successful, then and only then, is the user allowed to proceed into the next page, and be presented with a set of options for home banking. That set of options would contain hypertext links to other documents, these other documents may provide more details about the type of transaction.

As the Web system exists today, someone using a Web browser could save the address of one of those downstream documents. The user could then jump right back to one of those documents, thereby bypassing the security screens. A known solution to this dilemma is to use security flags, which are set as the user goes through the security screens. However, this solution does not allow for elegant navigation of the Web site application. Moreover, it allows the users to fumble around inside of the application and get confused. Another disadvantage is that the solution would increase traffic that is non-productive and unusable, by accessing the document application out of sequence.

SUMMARY OF THE INVENTION

The invention, at a very high level, is a set of software state machines for defining a hierarchical menu structure by restricting movement between links. In other words, when a particular server receives a request for a link, the server accesses the state machine to check if the requirements or prerequisites to access that link have been satisfied. For instance, the user has entered at Document A, which allowed the state machine to increment to the state which indicates that the next three documents, B, C, D, are legal moves, but not document E. Then once document B has been selected the state machine indicates what the next legal options are at that point. Thus, the state machine defines the structure of the hierarchical menu system. This constrains the freeform hypertext links or the random access links to a more structured menu system. A particular document can only be accessed if referenced from a defined prior document. In some situations, a particular document might be allowed access from just one other document, or perhaps from several other documents, depending upon the hierarchical commands that have been set up prior to the retrieval of the particular document.

It is a technical advantage of the invention to impose a structured, hierarchical format onto a freeform or random access system.

It is another technical advantage of the invention to define the hierarchical format by restricting movement to legal operations.

It is another technical advantage of the invention to use a state machine that references a state transition model, which contains the legal operations, as the mechanism to impose the hierarchical format.

It is still another technical advantage of the invention to use the state machine and the state transition model in an HTTP server for providing structure to HTML documents on the World Wide Web.

The foregoing has outlined rather broadly the features and technical advantages of the present invention to better understand the detailed description of the invention that follows. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Before discussing the details of the invention, it would be helpful to review the prior art system. This review is accomplished with respect to FIGS. 4, 5 and 6.

Figure 4:
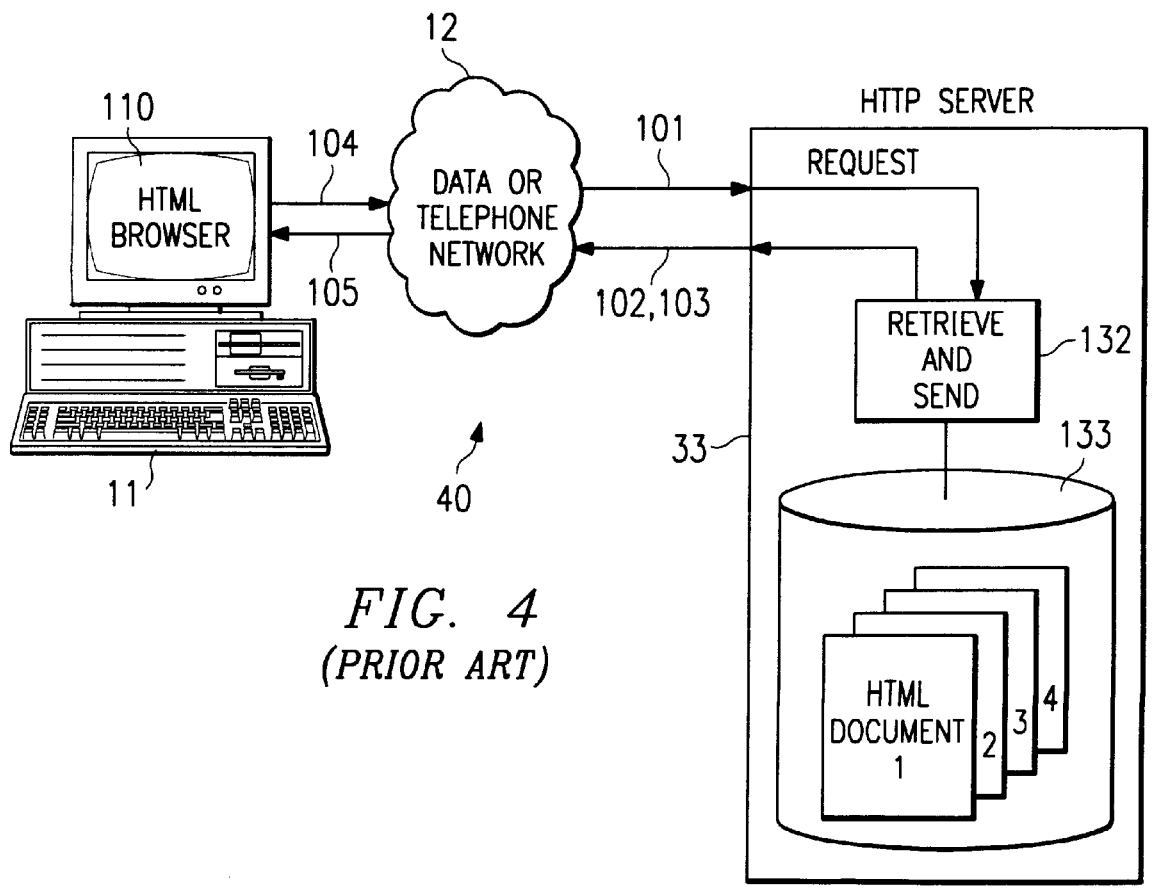
FIG. 4 shows a prior art internet server.

Prior art FIG. 4 shows a standard World Wide Web HTML browser 110 accessing information from HTTP server 33, through a data or telephone network 12. The sequence of events for accessing a Web site document are as follows. First, the user is connected to the internet through the network 12, and uses the HTML browser 110 to address specific HTML documents 1, 2, 3, 4, contained within HTTP server 33 on disk 133. Next, the browser 110 sends the document requests to the HTTP server 33 via channel 101, 104. The requests, or the addresses of the document, are processed by the server, and if available, the requested document is delivered. If no such document was located, an error message is returned stating that the document did not exist. The document is delivered by retrieving it from the disk and sending it to the browser, via the channel 102, 103, 105. The browser then displays the delivered document. At that point the user can select from many options in the browser. One option is to select a link to another document from the displayed document, and the process begins again.

Figure 5:
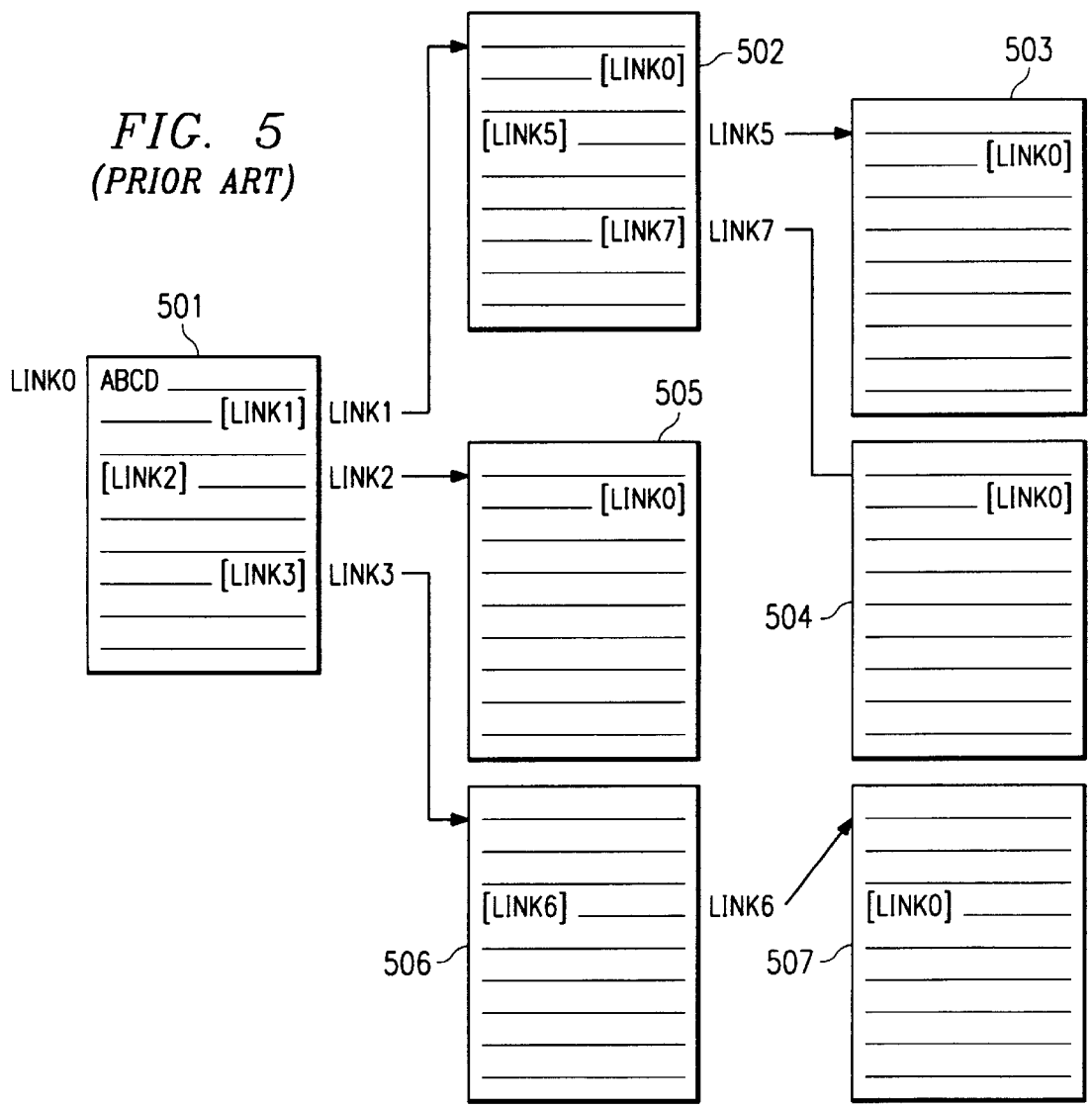
FIG. 5 shows the relationship between documents on the prior art server.

Prior art FIG. 5 depicts the relationship between documents within a single disk 133, or on different disks at the same HTTP server, or on different servers. Furthermore, these documents may be representative of a single application. In FIG. 5, the documents are labeled at a given address, links 0, 1, 2, 3, 4, 5, 6 and 7. The user could enter at link 0, and would be presented with three options, links 1, 2 and 3. The user could select one of those links, which in turn, would lead to the selected documents. However, the user could retain the address of any of these links and randomly access those links out of the intended order. So security could be breached or the application could be very clumsily navigated.

Figure 6:
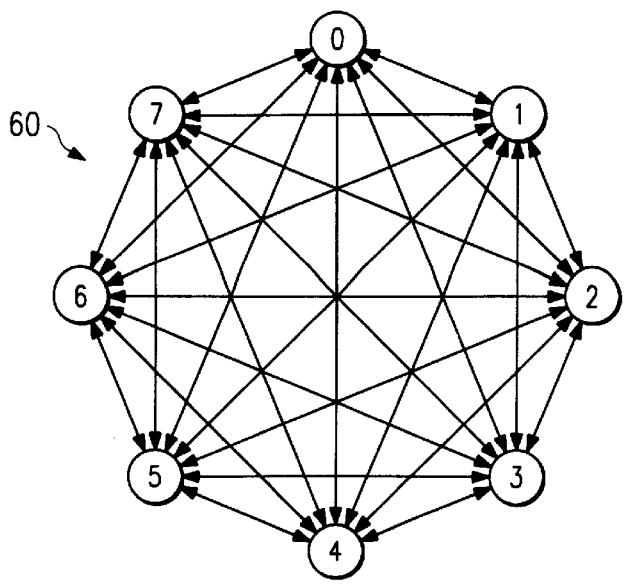
FIG. 6 shows the unconstrained state transactions of the prior art server.

Prior art FIG. 6 is a state transition model labeled 60, the numbers 0 through 7 correspond to the links identified in FIG. 5. What is illustrated is the fact that each of those links can be navigated to by any other link, merely by saving the address of each link. Thus, simply by performing random navigation, all these combinations of links could be achieved. Moreover, any of these links can be entered from any other document that exists anywhere within the World Wide Web, and that could be millions of points of entry into any of these seven documents.

Figure 1:
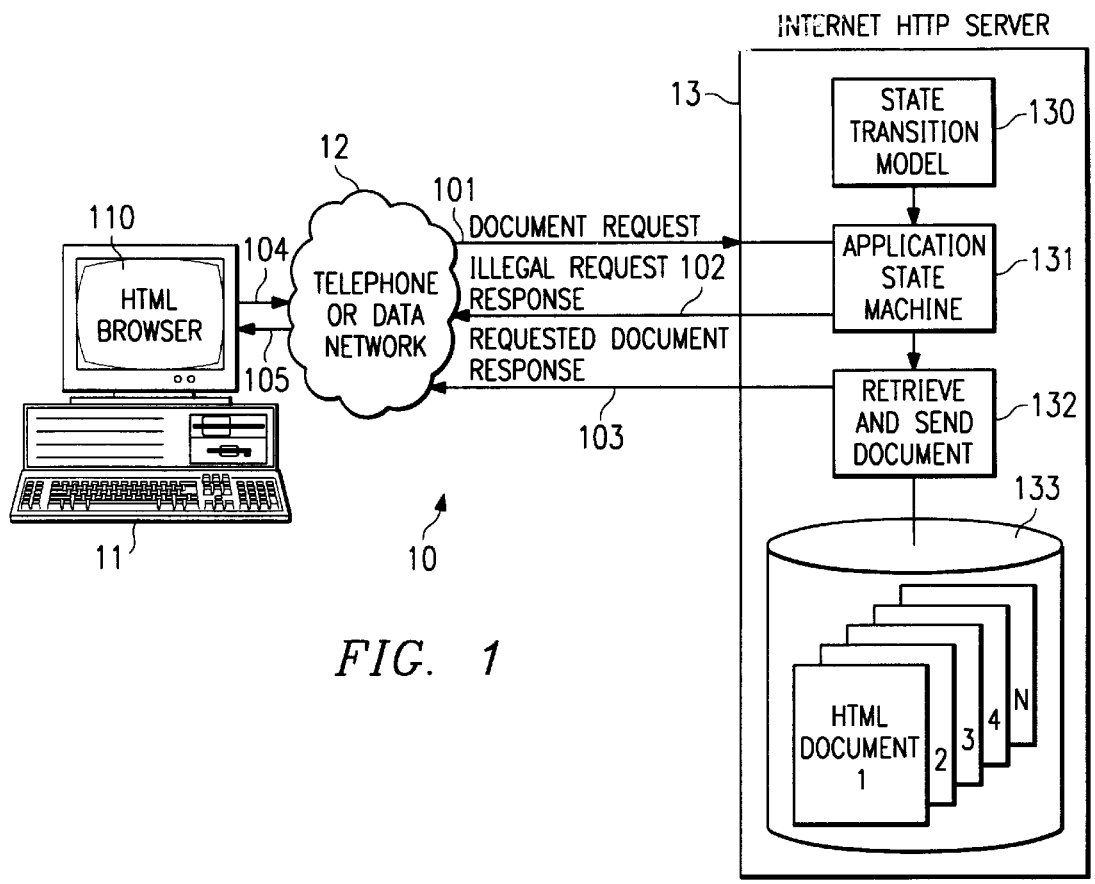
FIG. 1 shows a schematic of the inventive internet server.

FIG. 1 depicts the inventive HTTP server 13. The elements shown in FIG. 1, which have the same numerical labels as those in FIG. 4, also have similar functions. These components are the HTML browser 110 inside of a PC or workstation 11, communicating via telephone or data network 12 through information flow paths 101, 102, 103, 104 and 105. The invention is the addition to server 13 of state transition model 130 and application state machine 131. These components work with the server as follows. When a document request is sent to the HTTP server the application state machine intercepts that request. The state machine then processes the request by scrutinizing the current and past states of the request and comparing it with the valid transitions stored in the state model. For example, access to the requested document may be required to be preceded by execution of a another document containing access codes. The application state machine is a finite state machine that is fed by a state transition model that is defined per application. Once the application state machine examines the request and determines that in fact it is a legal state transition, the machine satisfies the request by authorizing the server to transmit the document via the normal HTTP mechanisms. If the application state machine determines that it is an illegal request, the machine synthesizes and transmits an error document indicating to the requesting user that they have entered into an illegal location, or that they have entered into the location out of sequence.

Figure 2:
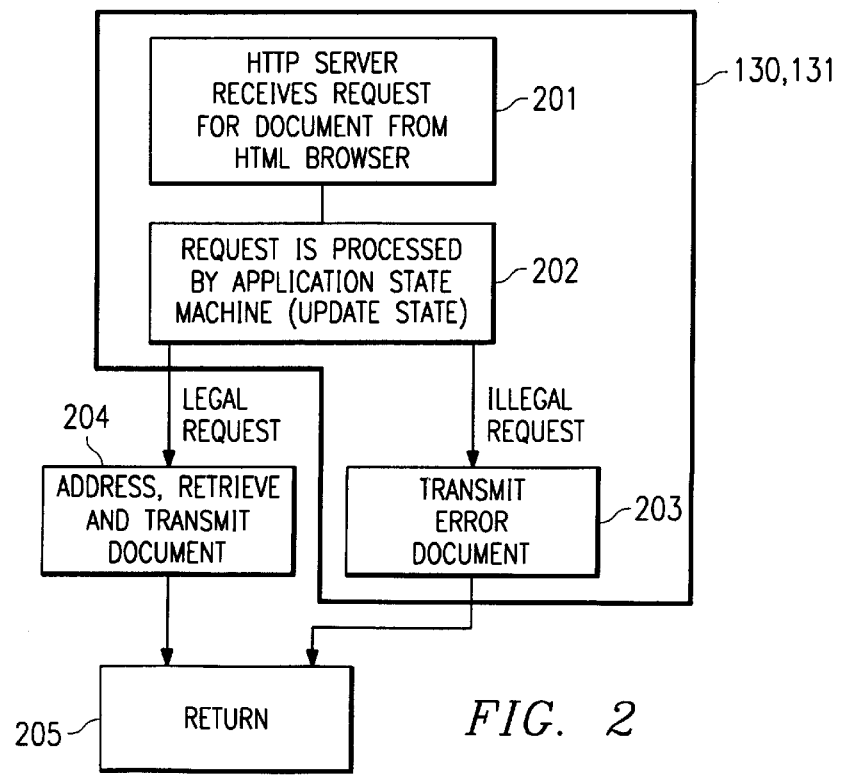
FIG. 2 shows a schematic of the flow of information for the inventive server.

FIG. 2 is a schematic depicting the information flow. The HTTP server receives a request for the document from HTML browser 201. The request is processed by the application state machine 202. The machine also updates itself as to the current state or location of the requesting user. The machine then determines whether it was a legal or illegal request, based the state of the current request and the model stored in the state transition model. In the case of an illegal request, the machine would synthesize and transmit an error document 203 and then return to the top of the program 205. If it was a legal request coming out of application state machine 202, the machine would authorize the server to address, retrieve and transmit the requested HTML document 204 and then return 205.

Figure 3:
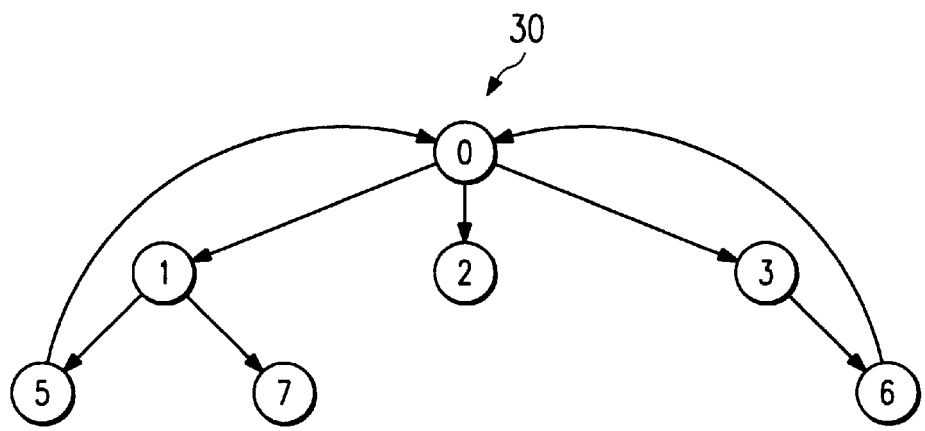
FIG. 3 shows an example of how the invention can constrain the number of legal state transactions.

FIG. 3 shows an example of how the number of legal state transitions that define the relationships between these documents can been constrained, as contrasted to FIG. 6. Thus, the user is forced into a hierarchical menu system using the standard HTML browser as modified by this invention. Moreover, each user in a system may have a different hierarchical menu or state transition model. This would be used to provide different levels of security to the documents in the system. For example, in a corporate environment, a supervisor may be able to link directly to a particular document, whereas a subordinate may not have access or may have only limited access, such as read privileges after entering a password. Additional means for associating each state transition model to a particular user, other than a password may include an originating address to a work station in an intranet or a network ID on the internet, a caller ID type telephone number identifier, a voice print analyzer, or other authentication means.

The invention has many practical uses such as: monitoring a tutorial program, where progression to a higher level is not allowed until mastery of the lower levels, e.g., regulating an insurance company reviewing medical records at a medical establishment, or for a web site user viewing movie advertising that depicts the plot segments a particular order. In addition to being applied to the internet, the invention can be used on "intranets", stand alone kiosks or any PC base application using HTML, JAVA, or other browser based user interfaces.

Although the invention is described in terms of HTML, the invention would function for any language used on the internet or intranets, such as JAVA, VRTL, or for any language that allows freeform or random access links between documents.

Although the present invention and its advantages have been described in detail, it should be understood that various changes, substitutions and alterations can be made herein without departing from the spirit and scope of the invention as defined by the appended claims.

What is claimed is:

1. A system for enforcing a hierarchical menu structure for a document of a plurality of documents present on a server, the system comprising:

means for receiving a request for access to a document from a user;

means for examining at least one factor for granting authorization to the user to access the document, wherein another document has been most recently accessed by said user;

means for establishing the another document as a factor of said at least one factor in the step of examining; and means for prohibiting access to the document except when said authorization is granted.

2. The system of claim 1, wherein the server is a global network server.

3. The system of claim 1, wherein the server is a local network server.

4. The system of claim 1, wherein the system is a stand-alone unit.

5. The system of claim 1, further comprising:

means for generating a signal informing the user of denial of the request upon determination that authorization is not granted.

6. The system of claim 5, further comprising:

means for delivering the signal to the user.

7. The system of claim 5, wherein the signal is an error message.

8. The system of claim 1, further comprising:

means for generating a signal informing the user of denial of the request upon determination that the document could not be located.

9. The system of claim 1, further comprising:

means for storing the document; and means for retrieving and delivering the document to the user after access has been granted.

10. The system of claim 1, wherein:

the user requests the document from a computer operating a HTML browser.

11. The system of claim 1, wherein:

the document is written in a language from the group consisting of:

HTML, VRTL and JAVA.

12. The system of claim 1, further comprising:

means for storing at least one authorization model for a plurality of users, wherein said at least one authorization model determines whether the document can be accessed; and means for associating each authorization model with a particular user of said plurality of users.

13. The device of claim 1, further comprising:

means for storing a plurality of authorization models for a plurality of users, wherein each authorization model corresponds to at least one user of said plurality of users; and means for associating each authorization model to a particular user of said plurality of users.

14. The system of claim 1, wherein:

the means for receiving is a telephone network.

15. The system of claim 1, wherein:

the means for receiving is a data network.

16. The system of claim 1, wherein:

the document references another document.

17. The system of claim 16, wherein:

said another document is stored on the server.

18. The system of claim 16, wherein:

said another document is stored on another server located remote from the server.

19. A method for enforcing a hierarchical menu structure for a document of a plurality of documents present on a server, the method comprising the steps of:

receiving a request for access to a document from a user;

examining at least one factor for granting authorization to the user to access the document, wherein another document has been most recently accessed by said user;

establishing the another document as a factor of said at least one factor in the step of examining; and prohibiting access to the document except when said authorization is granted.

20. The method of claim 19, wherein the server is a global network server.

21. The method of claim 19, wherein the server is a local network server.

22. The method of claim 19, wherein the user has an identity and the identity of the user is a factor of said at least one factor.

23. The method of claim 19, wherein the user has a document access history and said document access history is a factor of said at least one factor.

24. The method of claim 19, wherein the step of prohibiting ensures restricted access to documents for security purposes.

25. The method of claim 19, wherein the step of prohibiting enforces a logical sequence of access to said plurality of documents.

26. The method of step 19, further comprising the steps of:

denying access to the document; and sending the user an error message when authorization is not granted.

27. The method of step 19, wherein said request to access the document is effected through use of a hypertext link.

28. The method of step 19, wherein said request to access the document is effected through the use of a freeform link.

29. The method of Step 19, wherein said request to access the document is effected through the use of a form of random access link.

30. The method of step 19, wherein means for authentication is a factor of said at least one factor.

31. The method of step 30, wherein the means for authentication comprises a password.

32. The method of claim 19, wherein the document is written in a language selected from the group consisting of:

HTML, VRTL, and JAVA.

33. The system of claim 1, wherein the user has an identity and the identity of the user is a factor of said at least one factor.

34. The system of claim 1, wherein the user has a document access history and said document access history is a factor of said at least one factor.

35. The system of claim 1, wherein the means for prohibiting comprises means for ensuring restricted access to documents for security purposes.

36. The system of claim 1, wherein the means for prohibiting comprises means for enforcing a logical sequence of access to said plurality of documents.

37. The system of step 1, further comprising:
means for denying access to the document; and
means for sending the user an error message when authorization is not granted.

38. The system of step 1, wherein said request to access the document is effected through use of a hypertext link.

39. The system of step 1, wherein said request to access the document is effected through the use of a freeform link.

40. The system of step 1, wherein said request to access the document is effected through the use of a form of random access link.

41. The system of step 1, wherein means for authentication is a factor of said at least one factor.

42. The system of step 41, wherein the means for authentication comprises a password.

43. A method for enforcing a hierarchical menu structure for a world wide web site having a plurality of web pages, the method comprising the steps of:

receiving a request for access to a web page from a user;

examining at least one factor for granting authorization to the user for accessing the web page, wherein the user is currently at another web page;

establishing the web page address of the another page as a factor of said at least one factor; and prohibiting access to the web page except when said authorization is granted.

\* \* \* \* \*